July 18, 1950     T. DE FOREST ET AL     2,515,396
APPARATUS FOR DETECTING SURFACE DISCONTINUITIES
Filed Oct. 7, 1946     2 Sheets-Sheet 1
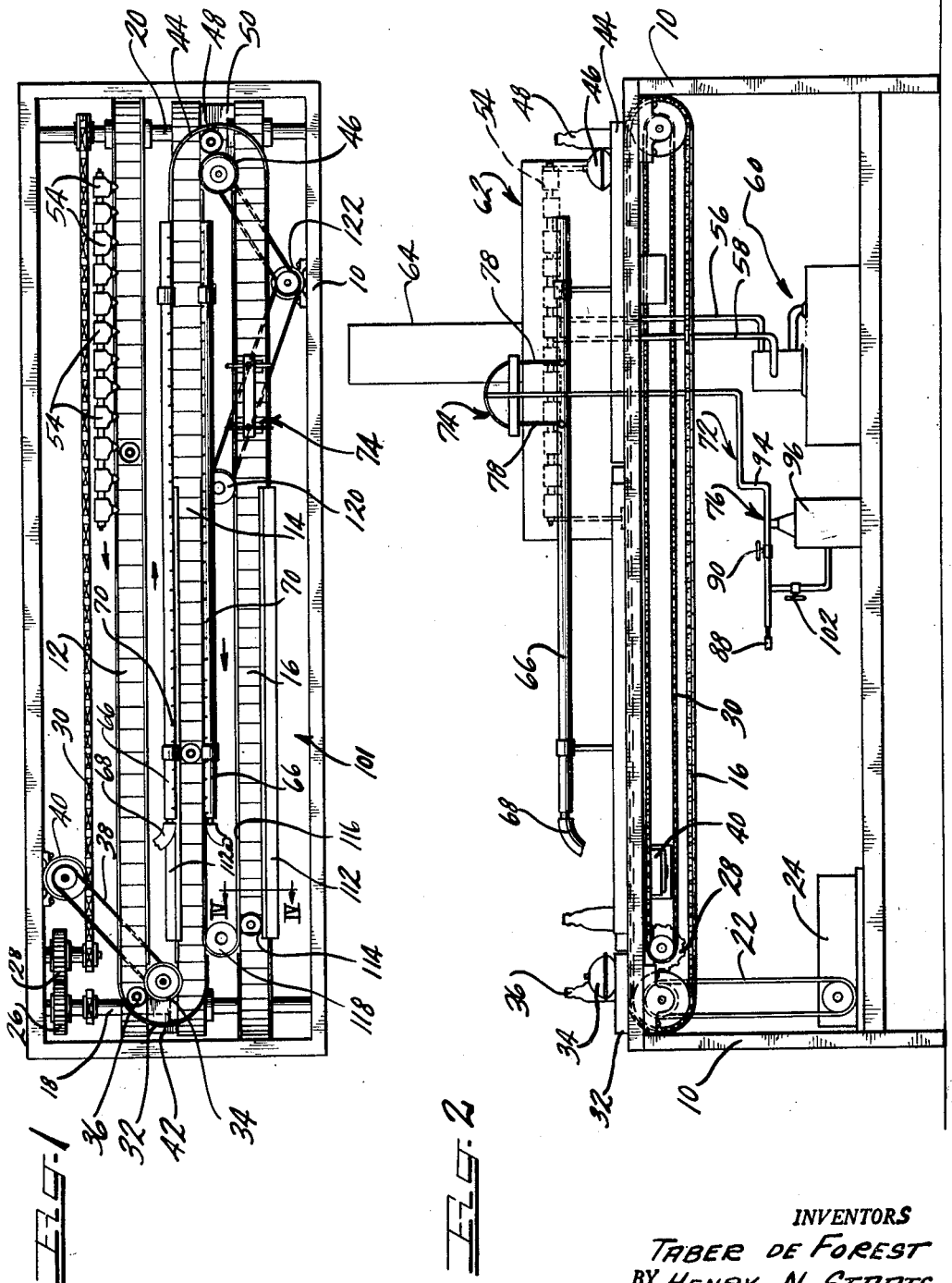
INVENTORS
TABER DE FOREST
BY HENRY N. STAATS.
ATTYS.

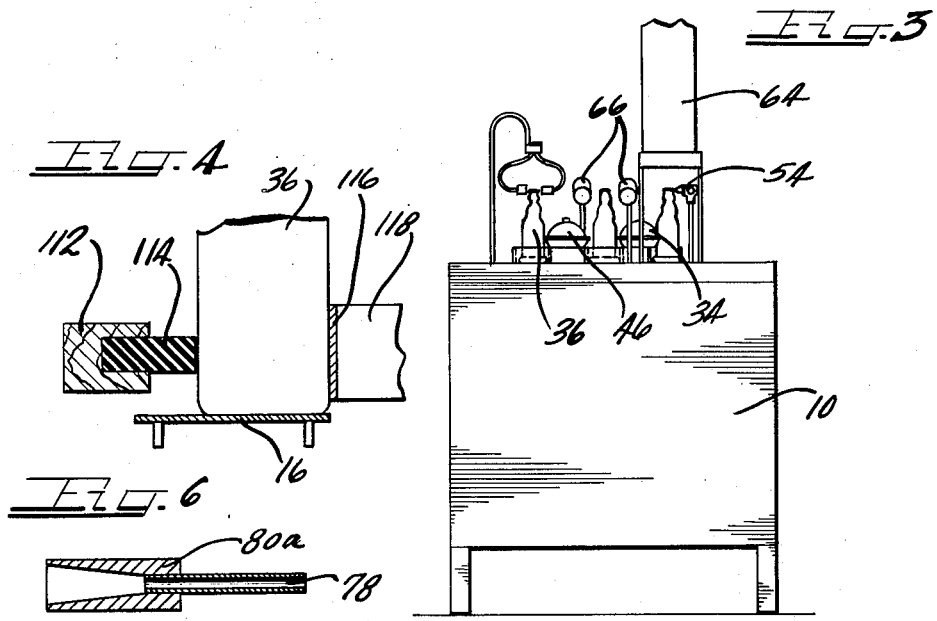
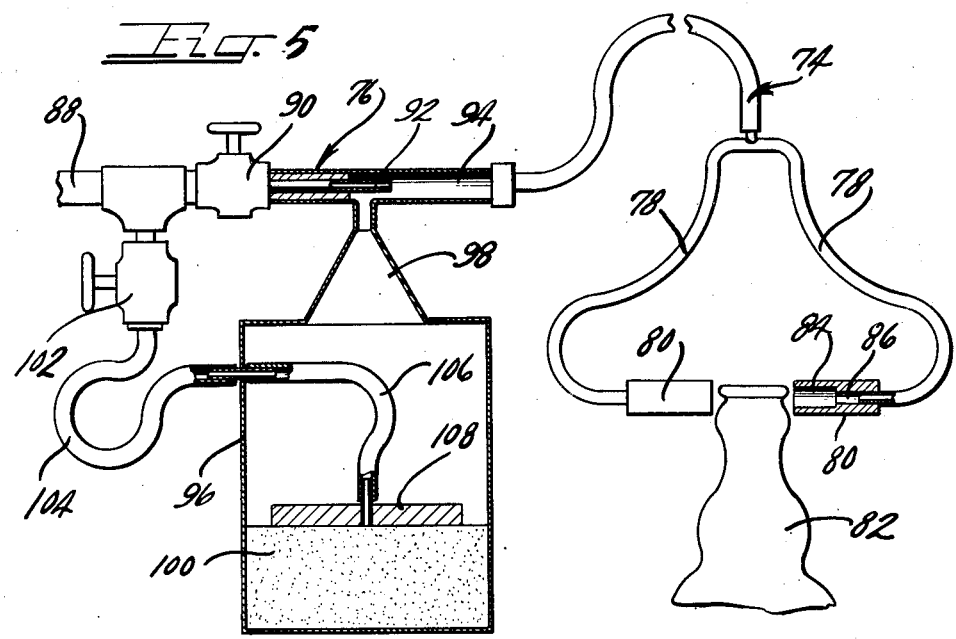
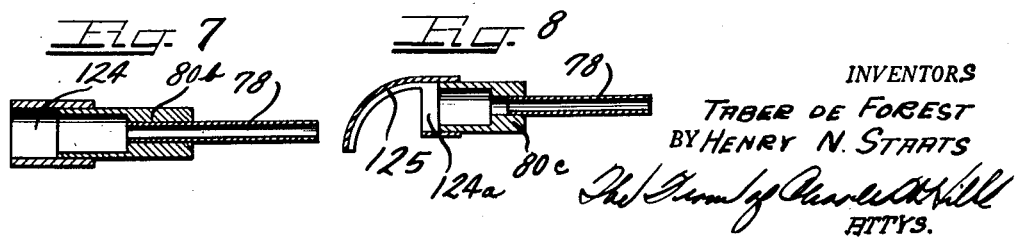

Patented July 18, 1950

UNITED STATES PATENT OFFICE

2,515,396

APPARATUS FOR DETECTING SURFACE DISCONTINUITIES

Taber de Forest, Northbrook, and Henry N. Staats, Chicago, Ill., assignors to Magnaflux Corporation, Chicago, Ill., a corporation of Delaware Application October 7, 1946, Serial No. 701,704

7 Claims. (Cl. 175—183)

This is a continuation-in-part of our copending application Serial No. 648,234, filed February 18, 1946, now Patent No. 2,499,466, and assigned to the same assignee as the present invention, and relates to a means for detecting surface discontinuities in surfaces having relatively poor electrically conductive properties. More particularly, the invention relates to a method of testing for surface discontinuities, such as cracks or the like, in articles formed of or surfaced with vitreous, ceramic, plastic or other materials that may be generally referred to as dielectrics.

As pointed out in our above-mentioned copending application we have found that if, in the testing of glass bottles for surface cracks, the bottles are first wet with water or a water-miscible liquid, preferably containing a surface tension reducing agent, and the surface then dried superficially, electrostatically charged finely divided particles are attracted to cracks and surface discontinuities and adhere thereto in preference to the unblemished or continuous portions of the surface. Under the preferred conditions for carrying out this invention, the electrostatically charged particles build up at the cracks in well-defined comparatively dense conglomerations coextensive with the cracks. The result is a definite visual indication not only of the presence and location of any cracks in the surface to which electrostatic charged particles are applied, but also of the relative dimensions of the cracks. By the use of solid particles of a color contrasting with the color of the surface undergoing test, distinctive visual indications are given the observer of such cracks and discontinuities in the surface. There is thus provided a simple and convenient method of testing for cracks and other surface discontinuities in electrically non-conducting materials.

It is an object of our invention to provide a machine for testing electrically non-conductive objects for surface discontinuities and cracks by the method of our copending application Serial No. 648,234, filed February 18, 1946, entitled "Method of Detecting Surface Discontinuities," now Patent No. 2,499,466, and assigned to the same assignee as the present invention.

Further it is an object of our invention to provide a continuously operable machine suitable for use in flow processes for production testing of electrically non-conductive objects for surface cracks and discontinuities.

Another object of our invention is to provide a machine for testing electrically non-conductive objects for surface cracks and discontinuities having features of construction, combination, and arrangement, whereby completely automatic testing is achieved and in which the only apparatus exposed to the view of the operator is a continuous stream of objects which may visually be examined to determine the presence of surface discontinuities and cracks.

It is yet another object of our invention to provide means to transfer objects from one conveyor to another in simple and reliable manner and without altering the magnitude of the velocity thereof.

Still another object of our invention is to provide a simple and effective means to rotate cylindrical objects such as bottles as they pass along a conveyor, said means being arranged to continue the uninterrupted linear motion of these objects.

It is yet another object of our invention to provide improved nozzles for blowing a charged cloud of powder about a surface being tested for discontinuities and cracks.

Further, it is an object of our invention to provide an improved device for the production of a stream of powder-laden air about a body having surfaces to be tested for discontinuities.

Another object of our invention is to provide improved bottle testing machine having features of construction rendering it completely self-contained and small in size to the end that it have maximum economy of space and a high degree of flexibility for application to bottle handling operations of various types.

The novel features which we believe to be characteristic of our invention are set forth with particularity in the appended claims. Our invention itself, however, both as to its organization and method of operation, together with further objects and advantages thereof, may best be understood by reference to the following description taken in connection with the accompanying drawings.

On the drawings:

Figure 1 is a plan view of an apparatus incorporating the features of our invention with the penetrant collecting hood removed;

Figure 2 is a side view of the apparatus of Figure 1 with the penetrant collecting hood in position;

Figure 3 is an end view of the apparatus of Figure 2;

Figure 4 is a cross-sectional view through section IV—IV, Figure 1;

Figure 5 is a view of the apparatus for producing a cloud of electrically charged particles used in the machine of Figure 1; and Figures 6, 7 and 8 are cross-sectional views of alternate forms of the nozzle portion of the apparatus of Figure 5.

As shown on the drawings:

The bottles or other objects to be inspected are moved along the apparatus of our invention by belts 12, 14 and 16, Figure 1, these belts being suspended from pulleys on shafts 18 and 20 which are in turn mounted on bearings attached to the frame 10. Shaft 18 is the primary drive shaft and is rotated by belt 22, Figure 2, which has motion imparted to it by the drive mechanism contained within unit 24, Figure 2, this mechanism including, for example, an electric motor. Belt 14 is mounted on shaft 18 by a pulley which is free to rotate with respect thereto whereas belts 12 and 16 are mounted on pulleys incapable of rotary motion with respect to shaft 18, thereby causing motion of these belts in accordance with the rotation of shaft 18. It is the purpose of gears 26 and 28 to produce rotary motion of velocity determined by the angular velocity of shaft 18 but in the reverse direction, this motion being communicated to shaft 20 by chain 30. Belt 14 is mounted about a pulley fixedly connected to shaft 20 so as to rotate therewith whereas belts 12 and 16 are mounted on pulleys free to rotate with respect to that shaft.

From the above description it is evident that as motion is imparted to belt 22 by the drive mechanism 24, belts 12 and 16 are moved by shaft 18 so as to move their upper or supporting surfaces seen in Figure 1 in a common direction whereas belt 14 is moved by shaft 20 so that its upper or supporting surface is moved in the opposite direction, the velocity of motion of belt 14 being identical with that of belts 12 and 16 by reason of the gear ratios of gears 26 and 28, together with the diameters of the pulleys upon which chain 30 and belts 12, 14 and 15 operate.

It is the purpose of guide 32 and rotating ball 34 to transfer bottles from conveyor belt 12 to conveyor belt 14 without change in the magnitude of velocity thereof. To this end, the diameter of rotating ball 34 and the radius of curvature of semi-circular portion of guide 32 are chosen so that a bottle 36 is engaged by the surface of rotating ball 34. Ball 34 is further rotated by belt 38 connected to drive motor 40, the resultant rotational velocity of ball 34 being such that the tangential velocity along the outer rim thereof is twice the linear velocity of belts 12 and 14. Velocity of magnitude equal to twice the velocity of belts 12 and 14 is thereby imparted to one edge of bottle 36 while the opposite edge is held motionless by guide 32. The bottle is thereby rotated about its axis and in addition receives a resultant linear velocity equal to the linear velocity associated with the operation of belts 12 and 14. Since the linear velocity imparted to bottle 36 is the same as it is transferred from conveyor belt 12 to conveyor belt 14 as when the bottle is passing along the belt, no tendency exists for bottles to accumulate about the curved portion of guide 32 and a uniform constant velocity transfer is achieved. Surface 42 which is in the plane of the upper side of belts 12 and 14 supports the bottle while making this transfer.

It is the purpose of guide 44, rotating ball 46, and surface 50 to transfer bottles in the position of bottle 48 from conveyor belt 14 to conveyor belt 16 in the same manner as above described with reference to guide 32, rotating ball 34, and surface 42. Thus bottles placed on the right hand or entering portion of belt 12 are transferred from the left hand or exit portion of that belt to the left hand or entrance portion of belt 14 and from the right hand or exit portion of that belt to the left hand or entrance portion of belt 16 so that a continuous passage is provided from one end of belt 12 to the opposite end of belt 16.

Having described the apparatus for uniformly moving the bottles along the belts and transferring from one belt to the other, we will now describe the apparatus for conducting the various bottle treating operations. As the bottles first pass along conveyor belt 12, liquid penetrant is sprayed thereon by the bank of sprayers 54. Each of these units consists of a liquid sprayer capable of producing a finely divided cloud of fluid spray when compressed air and fluid are supplied thereto, these being supplied through pipes 56 and 58 from the unit shown generally at 60. The cloud of spray or mist produced by each unit 54 is sufficiently distributed in space and has a sufficiently slow rate of settling to be in contact with all sides of the bottles as they pass along this portion of the equipment. A hood 62 is placed over sprayers 54 and the portion of belt 12 adjacent thereto and an exhaust draft therefrom provided by a suitable fan located within stack 64. Condensing apparatus may be provided in stack 64 so that the vapor drawn up through stack is recovered and may be supplied to unit 60 for further use. Thus as the bottles pass along belt 12 the portions sought to be inspected, as, for example, the head and neck portion, are sprayed with the penetrants from units 54.

It is the purpose of air pipes 66 to evaporate any of the penetrant remaining superficially on the surfaces of the bottles passing along belt 14. To this end, these pipes are connected to compressed air hoses 68 and are provided with a plurality of openings 70, each of these openings facing belt 14 so as to project a stream of air across the surface of belt 14. As shown in Figure 3, the pipes 66 are slanted so that the streams of air from openings 70 pass over a substantial portion of the axial height of the bottle, thereby removing all excess of penetrant from the surface area to be tested.

The purpose of the apparatus shown generally at 72, Figure 2, is to produce a cloud of powder over the bottles as they travel along the early portions of belt 16. This apparatus consists of two portions, the spray producing portion 74 located above belt 16 and the powder producing portion 76 located below the belt. The construction of both of these portions will be evident from examination of Figure 5 which shows them in enlarged, somewhat diagrammatic, cross-sectional view. It will be evident that the spray portion 74 consists of pairs of pipes 78 each terminated in a nozzle 80, the nozzles being located so as to direct the powder onto the portions of the bottle 82 desired to be tested, in this case the lip and neck portions. Two sets of pipes 78 are provided as shown in Figure 2 so that the portions of the bottle being tested are subjected to two direct streams of powder as well as a region wherein such powder is suspended in the air.

As shown in Figure 5, the nozzles 80 contain two cylindrical openings 84 and 86, opening 84 having a larger diameter than opening 86 so as to provide nozzle action. In addition, opening 86 is of diameter corresponding to the exterior of pipe 78 and is in frictional engagement with the latter to permit adjustment relative to that pipe. The nozzle 80 is preferably constructed of hard rubber to produce a maximum electrostatic charge in the powder applied to the bottle. Alternatively, phenol-formaldehyde resin (Bakelite), wood, paper, ethyl cellulose resin, and similar materials may be used. It is further possible to produce a charged powder by use of a metal nozzle connected to a source of electromotive force.

The powder producing portion of the spray mechanism 74 is shown generally at 76, Figure 5. Air under pressure is applied to this mechanism through pipe 88 which is connected to pipes 78 through valve 90 and aspirator pipes 92 and 94. The powder 100 to be sprayed is stored in container 96 which is provided with an outlet passage 98 communicating with the portion of aspirator casing 94 behind inner aspirator pipe 92. Thus, as the compressed air from pipe 88 is discharged at high velocity from the nozzle end of pipe 92, a region of low pressure is produced about the pipe 92 that causes powder 100 to be drawn from container 96 through passage 98 and into pipe 94. This powder-air mixture is then passed through pipe 78 and directed onto the bottle being tested by nozzles 80.

It is the purpose of valve 102 and pipe 104, together with pipe 106 and float member 108, to apply a portion of the compressed air from pipe 88 to the container 96. This air is directed downwardly into the body of powder 100, thereby producing a maximum degree of agitation therein and increasing the portion of powder flowing out through passage 98. In addition, the powder is distributed more evenly throughout the air by the agitation due to air flow in pipe 106.

After passing through the outer spray mechanism 72, the bottles pass through the inspection station, shown generally at 101, Figure 1. At this point the appearance of the bottles may be observed by the operator and the presence of deposits of powder noted. Inasmuch as these deposits indicate the presence of surface cracks or other discontinuities, the operator is advised of such defects and the bottles containing them may be removed.

While the bottles are passing between pipes 66 and across the inspection station 101 it is desirable that they be rotated so that in one case the air streams from openings 70 impinge upon all surfaces thereof and in the other case the inspector may see all sides thereof. To this end, bottle rotating mechanisms are provided at these points in the system, a cross-sectional view of one mechanism being shown in Figure 4, this view being taken through lines IV—IV, Figure 1. As shown in this figure and in plan view in Figure 1, a guide 112 is provided at one side of the belt 16, this guide having a frictional member 114 of rubber or similar material to engage the edge of the bottles as they pass and to hold that edge against linear motion. The opposite side of the bottles are engaged by belt 116 which rides over pulleys 118 and 120. These pulleys are rotated by motor 122, Figure 1, so as to impart to the belt 116 a linear velocity equal to twice the linear velocity of belts 14 and 16. One side of each bottle is thus moved at a linear velocity twice the linear velocity of belt 16 while the other edge is held stationary. Hence the bottle is rotated about its axis while the center thereof tends to move linearly at velocity equal to that of belt 16, since the average velocity of the belt and the guide is equal to the velocity imparted by conveyor belt 16, thereby rotating the bottle without imparting linear velocity thereto. Similar action is provided by friction guide 112a coacting with the opposite side of belt 116 to rotate the bottles as they pass pipes 66.

Figures 6, 7 and 8 show alternative forms of the nozzle 80, Figure 5. In Figure 6, the nozzle 80a is mounted on pipe 78 and has a conical opening rather than the stepped cylindrical opening shown in Figure 5. In Figure 7, the nozzle 80b has a cylindrical opening and in addition supports a sleeve portion 124 from its outer surface. Portion 124 is movable with respect to nozzle 80 and nozzle 80 is movable with respect to pipes 78 so as to permit adjustments for optimum performance. In Figure 8 the nozzle structure 80c corresponds to Figure 7 except that member 124a has an overlapping shield portion 125 to direct the powder in a downward direction.

As pointed out in our copending application Serial No. 648,234, filed February 18, 1946, now Patent No. 2,499,466, and assigned to the same assignee as the present invention, the powder contained within container 96 may be any finely divided material capable of being sprayed to produce a suspension of charged particles. In general, we have found it preferable to employ non-hygroscopic inorganic substances capable of being highly charged electrostatically. Calcium carbonate, or precipitated chalk, has thus far been found to be one of the best materials. However, it is possible to use talc, powdered mica, diatomaceous earth, clays such as kaolin, calcium sulfate, iron oxide, carbon black, aluminum powder, and many others. The selection of powder for this purpose is, of course, based on economic factors, together with the susceptibility of the powder to produce silicosis or support combustion and its effectiveness in the apparatus.

It will be evident that the above-described apparatus is capable of automatically carrying out the process described and claimed in our above-identified copending application. The bottles are subjected to a spray of penetrant on belt 12, dried on belts 12 and 14, subjected to a spray of charged powder on belt 16, and inspected as they travel along the later portions of the latter belt. This entire operation is conducted in a uniform manner so as automatically to carry out the process on individual bottles as they are supplied and removed at a constant rate, thus enabling the machine to be placed in bottle filling works or similar locations where it is desired to detect bottles having flaws without interrupting other operations.

While we have shown a particular embodiment of our invention, it will, of course, be understood that we do not wish to be limited thereto since many modifications both in the elements disclosed and the cooperative structure may be made without departing from the spirit and scope thereof. We, of course, contemplate by the appended claims to cover any such modifications as fall within the true spirit and scope of our invention.

What we claim as new and desire to secure by Letters Patent in the United States is:

1. A tester for bottles and the like including a conveyor, a first station near the entrance end of said conveyor, means to spray penetrant over said bottles at said first station, a second conveyor, means to transfer bottles from the exit end of said first conveyor to the entrance end of said second conveyor, a second station along said second conveyor, means to blow air across said bottles at said second station, a third conveyor, means to transfer bottles from the exit end of said second conveyor to the entrance end of said third conveyor, a third station along said third conveyor, means to blow charged powder across said bottles at said third station, a viewing station close to the exit portion of said third conveyor, and means to rotate said bottles at said second station and said viewing station.

2. Testing apparatus for detecting surface discontinuities in bottles and the like comprising a frame, conveying means carried by said frame and adapted to convey in a continuous path articles to be tested, a plurality of spray nozzles carried by said frame for spraying a penetrating liquid onto said articles while carried by said conveying means, a conduit adjacent said conveying means to direct a fluid under pressure against said articles to superficially dry the same, means for forming a dispersion of finely divided, electrostatically charged particles in a fluid medium, a plurality of nozzles overlying said conveying means to direct said dispersion against said articles, and a conduit for connecting said dispersion forming means to said nozzle.

3. Testing apparatus for detecting surface discontinuities in bottles and the like comprising a frame, a belt conveyor adapted to progressively convey upon its surface articles to be tested, a first station near the entrance end of said conveyor, a plurality of spray nozzles carried by said frame at said first station for spraying a penetrating liquid onto said articles carried by said conveying means, a second station, an elongated perforated conduit extending along said conveying means at said second station to direct air under pressure on said bottle to superficially dry the same, a third station, means at said third station for forming a dispersion of finely divided, electrostatically charged particles in a gaseous medium, a plurality of nozzles at said third station overlying said conveyor to direct said dispersion onto said bottles on said conveyor, a conduit for conducting said dispersion to said nozzles, a viewing station adjacent the exit end of said conveyor, and means to rotate said bottles at said second station and at said viewing station.

4. Testing apparatus for detecting surface discontinuities in bottles and the like having a first station, means to spray penetrant over said bottles at said first station, a second station, means to blow air across said bottles at said second station, a third station, means to move said bottles progressively from station to station, and means at said third station to blow electrostatically charged powder across said bottles, said last-mentioned means including an aspirator nozzle, an enclosure containing a body of powder in communication with said nozzle, and means for admitting a stream of air into said powder so as to increase the turbulence thereof and facilitate the delivery of said powder to said aspirator nozzle, said last means comprising a float member freely supported on said body of powder and having a downwardly directed opening, and means to deliver air through said opening for discharge into said powder.

5. In testing apparatus for detecting surface discontinuities in bottles and the like, a first station, means at said first station to spray penetrant on said bottles, a second station, means at said second station to blow air across said bottles, a third station, means at said third station to blow electrostatically charged powder over said bottles, and means for conveying bottles progressively from station to station including a first conveyor, a second conveyor and a third conveyor, means to impart motion to said conveyors, means to transfer bottles from said first conveyor to said second conveyor and from said second conveyor to said third conveyor including circular guides extending from the exit portion of said first conveyor to the entrance portion of said second conveyor and from the exit portion of said second conveyor to the entrance portion of said third conveyor, and a cylindrical drive member mounted coaxially with each of said guides, the relative diameters of said guides and said members being proportioned to engage said objects on both sides when located therebetween, whereby rotation of said drive imparts linear velocity to said objects to transfer said objects from said first conveyor to said second conveyor.

6. Testing apparatus for detecting surface discontinuities in bottles and the like comprising a frame, a conveyor carried by said frame and adapted to convey in a continuous path articles to be tested, means carried by said frame adjacent said conveying means to introduce a fluid penetrant onto the surface of said articles while carried by said conveyor, means for superficially removing excess fluid penetrant from the surface of said articles carried by said conveyor while leaving fluid penetrant in any surface defects therein, and means for subjecting said articles while carried by said conveyor to a gaseous dispersion of finely divided electrostatically charged particles.

7. Testing apparatus for detecting surface discontinuities in bottles and the like comprising a frame, a plurality of conveyors carried by said frame and adapted to convey in a continuous path articles to be tested, means carried by said frame and extending along the length of one of said conveyors to deposit a layer of a penetrating liquid onto the surface of said articles as said articles travel along said conveyor, means extending along a second of said conveyors for superficially drying the surface of said articles carried by said conveyor while leaving liquid penetrant in any surface defects therein, means extending along the length of a third of said conveyors for forming a gaseous dispersion of finely divided electrostatically charged particles to envelop said articles while carried on said third conveyor, means for transferring said articles successively from one conveyor to another, and means along the length of said third conveyor beyond said dispersion forming means for rotating said bottles about their longitudinal axis to facilitate inspection thereof.

TABER DE FOREST.
HENRY N. STAATS.

REFERENCES CITED

The following references are of record in the file of this patent:

UNITED STATES PATENTS

| Number | Name | Date |
|---|---|---|
| 1,079,819 | Wright et al. | Nov. 25, 1913 |
| 1,501,135 | Picht | July 15, 1924 |
| 1,770,991 | Offenbacher | July 22, 1930 |
| 2,151,737 | Bryan | Mar. 28, 1939 |
| 2,198,766 | Gallagher | Apr. 30, 1940 |
| 2,228,877 | Howell | Jan. 14, 1941 |
| 2,259,400 | Switzer | Oct. 14, 1941 |
| 2,259,935 | Johnson | Oct. 21, 1941 |
| 2,343,891 | Dieffenbach | Mar. 14, 1944 |
| 2,353,813 | Deeren | July 18, 1944 |
| 2,455,874 | Newman | Dec. 7, 1948 |